(12) United States Patent
Morse

(10) Patent No.: US 10,179,894 B2
(45) Date of Patent: Jan. 15, 2019

(54) BEER FILTER AND METHOD OF FILTRATION

(71) Applicant: Mor-Dall Enterprises, Inc., Marshall, MI (US)

(72) Inventor: Aaron Morse, Marshall, MI (US)

(73) Assignee: MOR-DALL ENTERPRISES, INC., Marshall, MI (US)

(*) Notice: Subject to any disclaimer, the term of this patent is extended or adjusted under 35 U.S.C. 154(b) by 244 days.

(21) Appl. No.: 14/826,246

(22) Filed: Aug. 14, 2015

(65) Prior Publication Data

US 2016/0046894 A1 Feb. 18, 2016

Related U.S. Application Data

(60) Provisional application No. 62/037,137, filed on Aug. 14, 2014.

(51) Int. Cl.
| | | |
|---|---|---|
| *C12C 3/00* | (2006.01) | |
| *B01D 33/35* | (2006.01) | |
| *C12H 1/07* | (2006.01) | |
| *C12C 3/08* | (2006.01) | |
| *C12C 7/28* | (2006.01) | |
| *C12C 11/11* | (2006.01) | |
| *B01D 24/08* | (2006.01) | |
| *B01D 29/96* | (2006.01) | |

(52) U.S. Cl.
CPC .............. *C12C 3/00* (2013.01); *B01D 24/08* (2013.01); *C12C 3/085* (2013.01); *C12C 7/287* (2013.01); *C12C 11/11* (2013.01); *C12H 1/063* (2013.01); *B01D 29/965* (2013.01)

(58) Field of Classification Search
CPC ...... B01D 29/965; B01D 24/08; B01D 29/54; B01D 29/58; C12C 3/00; C12C 3/085; C12C 7/287; C12H 1/063
USPC ........................................ 210/399
See application file for complete search history.

(56) References Cited

U.S. PATENT DOCUMENTS

| 642,460 A | 1/1900 | Kersten |
| 726,427 A | 4/1903 | Haussermann |
| 3,224,358 A * | 12/1965 | Spielvogel ............... C12C 7/14 |
| | | 210/189 |
| 4,863,596 A * | 9/1989 | O'Callaghan .......... B01D 61/50 |
| | | 204/253 |
| 6,334,959 B1 * | 1/2002 | Sutton ................. B01D 35/143 |
| | | 210/767 |

(Continued)

FOREIGN PATENT DOCUMENTS

GB 993876 A * 6/1965 ........... B01D 29/117

*Primary Examiner* — Terry K Cecil

(74) *Attorney, Agent, or Firm* — Michael E. Dockins; Shumaker, Loop & Kendrick, LLP

(57) ABSTRACT

A beer filter and a method of brewing beer is disclosed, the beer filter including an outer sheath, an outer permeable sheath disposed in the outer sheath, and an inner permeable sheath disposed in the outer permeable sheath. The method includes steps of disposing an outer permeable sheath within an outer sheath, filling an outer permeable sheath with hops, disposing an inner permeable sheath within the outer permeable sheath, and causing beer to flow from a vessel through and out of the inner permeable sheath, through the hops in the outer permeable sheath, out of the outer permeable sheath and into the outer sheath, and from the outer sheath and back into the vessel.

9 Claims, 3 Drawing Sheets

(56) References Cited

U.S. PATENT DOCUMENTS

| | | | |
|---|---|---|---|
| 6,387,261 B1* | 5/2002 | Mojena | B01D 24/008 |
| | | | 210/315 |
| 8,524,083 B2 | 9/2013 | Wasmuht et al. | |
| 8,828,228 B2* | 9/2014 | Imagawa | B01D 29/114 |
| | | | 210/336 |
| 2002/0000405 A1* | 1/2002 | Diemer | B01D 29/19 |
| | | | 210/323.2 |

* cited by examiner

BEER FILTER AND METHOD OF FILTRATION

CROSS-REFERENCE TO RELATED APPLICATION

This application claims the benefit of priority of U.S. Provisional Patent Application Ser. No. 62/037,137 filed on Aug. 14, 2014 hereby incorporated herein by reference in its entirety.

FIELD OF THE INVENTION

The present invention relates to a filter device and, more particularly, a device for the filtration of beer and a corresponding method.

BACKGROUND OF THE INVENTION

During the manufacture of some types of beer, a technique known as dry hopping may be used may be used to add more hop aroma and flavor to a beer. Traditionally, dry hopping is done in beer styles like pale ales and India pal ales (also known as an IPA), but dry hopping may be used in other styles of beer as well. Since the hops are not boiled during the dry hopping process, oils are not extracted therefrom and bitterness of the beer is not increased. Dry hopping may be conducted during a time period three to five days before the final beer product is bottled or kegged. The reason for this is to have the hop aroma infuse with the beer without having the aroma fade. Another method is to add the hops to during the secondary (or conditioning) phase about two weeks prior to bottling. This allows the hops enough time to blend with the beer well.

Dry hopping typically involves adding a desired amount of hops into a brewing vessel filled with beer. The hops and beer are agitated and allowed to mix for a desired amount of time to infuse the beer with more hop aroma and flavor. Once the desired amount of time has passed, the hops is allowed to settle to the bottom of the vessel and the beer is removed from the vessel and bottled or move on to a subsequent processing step. The beer at the bottom of the vessel that is mixed with the hops is typically dumped down a drain as inconsumable. Depending on the size of the vessel, dozens if not hundreds of gallons of beer may be dumped for each batch of beer being brewed. This could amount to dozens or hundreds of barrels of beer during an entire brewing run which could amount to tens of thousands of dollars of beer or more.

It would be desirable to develop a beer filter and method of beer filtration that minimizes an amount of beer that is dumped after using a dry hopping technique.

SUMMARY OF THE INVENTION

Concordant and congruous with the present invention, a beer filter and method of beer filtration that minimizes an amount of beer that is dumped after using a dry hopping technique, has surprisingly been discovered.

According to one embodiment of the invention, a beer filter comprises an elongate outer sheath having a first end and a second end; an elongate outer permeable sheath disposed in the outer sheath, the outer sheath having a first end and a second end; and an elongate inner permeable sheath disposed in the outer permeable sheath, the inner sheath having a first end and a second end.

According to another embodiment of the invention, a beer filter comprises an elongate outer sheath having a first end and a second end, the outer sheath having pair of pivot arms disposed thereon; an elongate outer permeable sheath disposed in the outer sheath, the outer sheath having a first end and a second end; an elongate inner permeable sheath disposed in the outer permeable sheath, the inner sheath having a first end and a second end; and a stand on which the pair of pivot arms in contact therewith, the pivot arms facilitating a rotation of the beer filter with respect to the stand According to another embodiment of the invention, a method of brewing beer comprises the steps of disposing an elongate outer permeable sheath within an elongate outer sheath; partially disposing an inner permeable sheath within the outer permeable sheath; filling a space between the inner permeable sheath and the outer permeable sheath with a solid material; fully disposing the inner permeable sheath within the outer permeable sheath; and causing a liquid to flow from a vessel through and out of the inner permeable sheath, through the solid material in the outer permeable sheath, through and out of the outer permeable sheath and into a space formed between the outer permeable sheath and the outer sheath, and from the outer sheath and back into the vessel.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
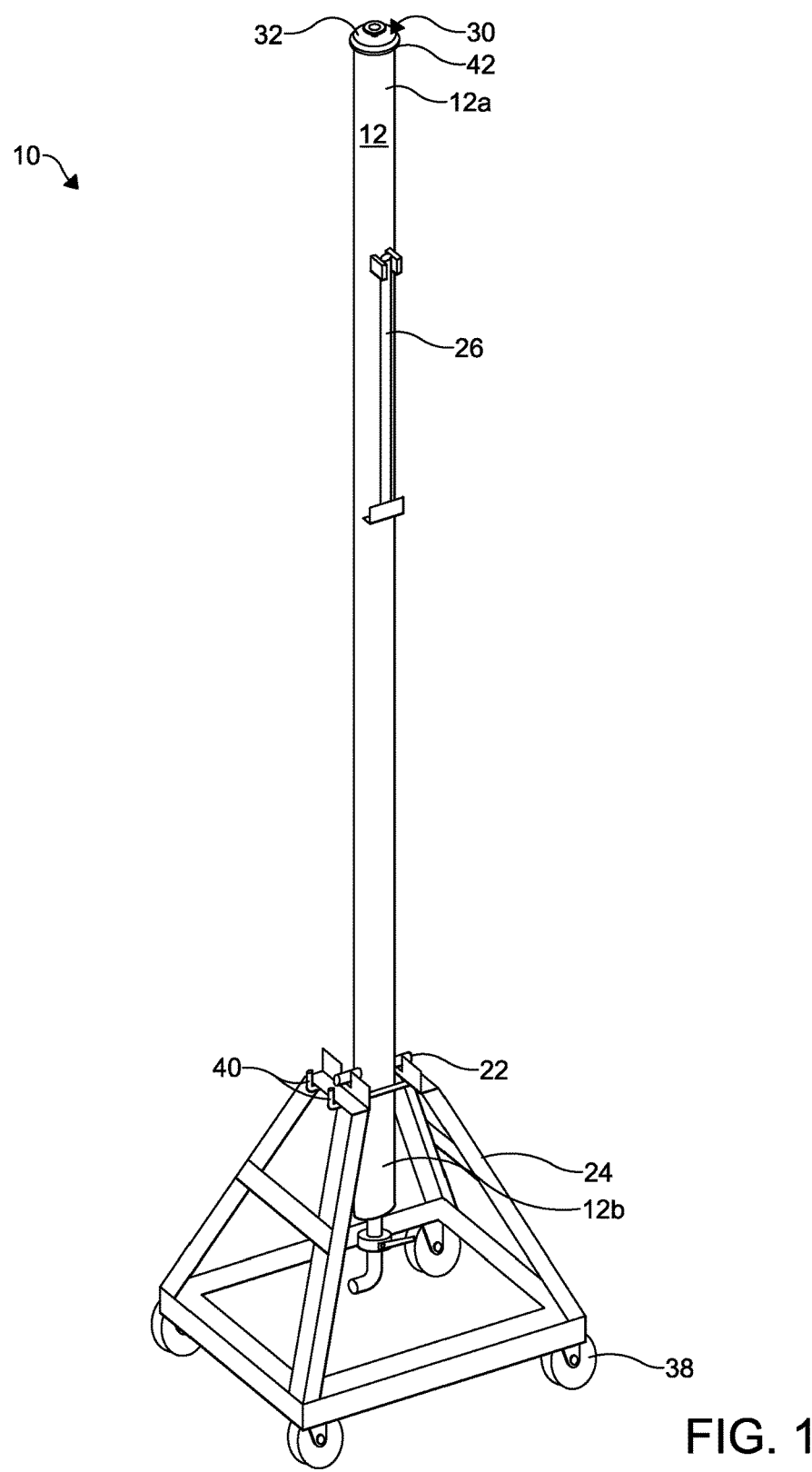
FIG. 1 is a perspective view of a beer filter according to an embodiment of the invention.
Figure 2:
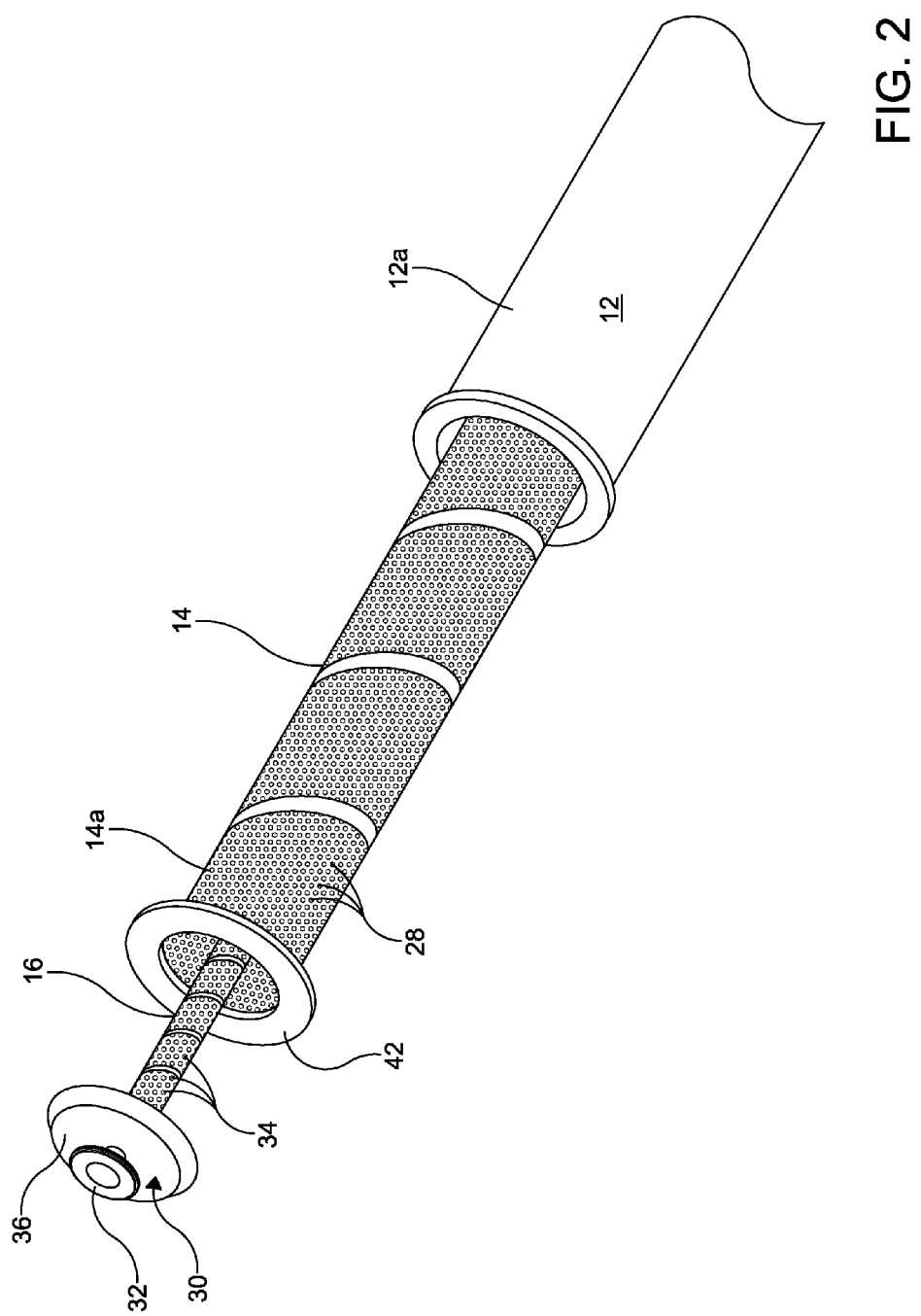
FIG. 2 is an exploded view of a portion of the beer filter of FIG. 1.
Figure 3:
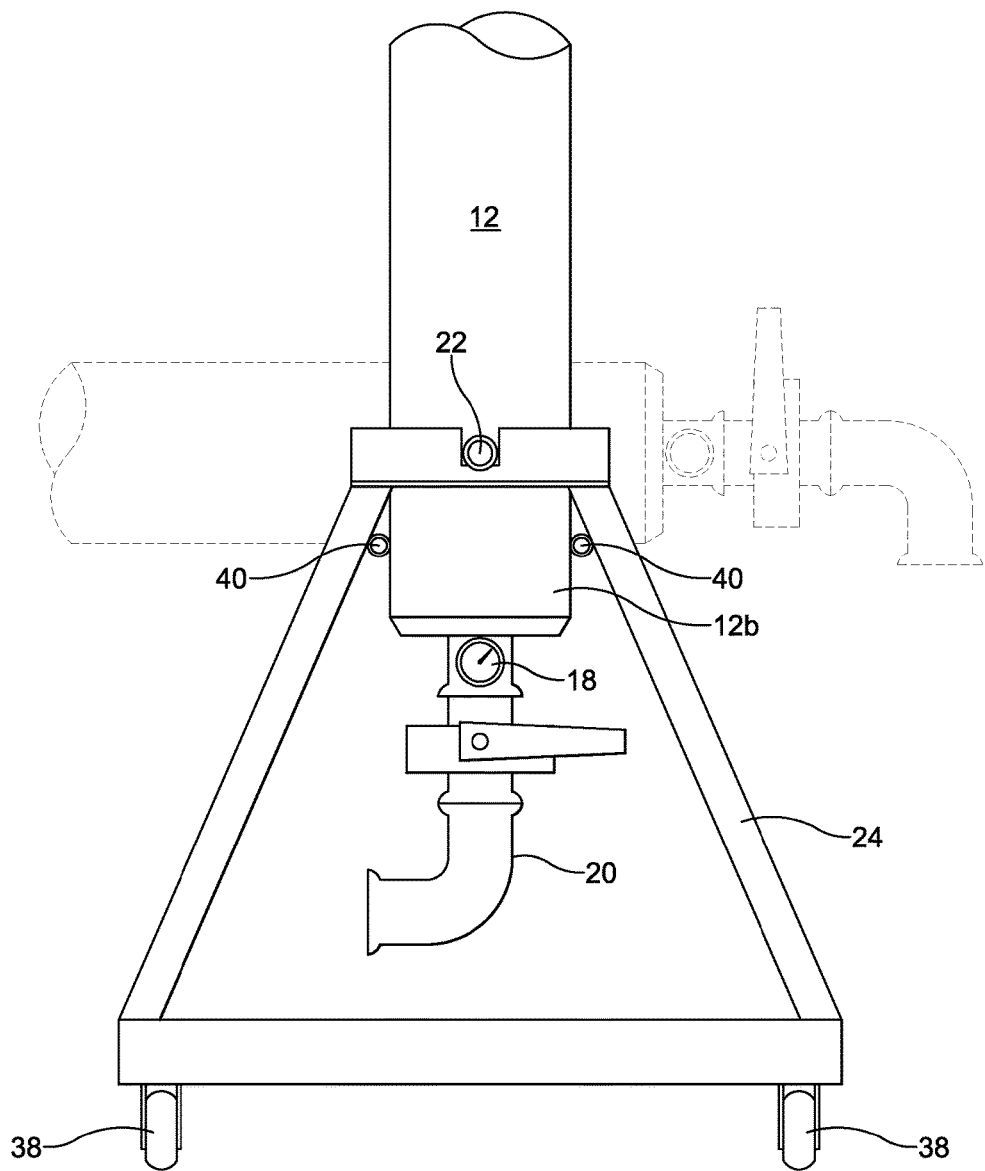
FIG. 3 is a partial view of a stand portion of the beer filter of FIG. 1.

FIGS. 1-3 show a beer filter 10 according to an embodiment of the invention. The beer filter 10 includes an outer sheath 12 for housing an outer permeable sheath 14 and an inner permeable sheath 16. The inner permeable sheath 16 is adapted to be disposed within the outer permeable sheath 14, and both the permeable sheaths 14, 16 are adapted to be disposed within the outer sheath 12. The embodiment of the invention shown in FIGS. 1-3 is adapted to filter beer that was made in a vessel (not shown) on the outside of the vessel. As shown, the sheaths 12, 14, 16 of the beer filter 10 are formed from stainless steel or other food-safe material. It is understood that the sheaths 12, 14, 16 may be formed of alloys or a combination of materials. For example, the permeable sheaths 14, 16 may have a portion thereof formed from a permeable filter formed from a fibrous material, a plastic, or other suitable material not formed from a metal.

FIGS. 1 and 2 best illustrate the outer sheath 12. The outer sheath 12 is an elongate tube having a first end 12a and a second end 12b through which the permeable sheaths 14, 16, solid materials, such as hops, liquids, such as beer, and or other materials may be inserted and/or removed. The first end 12a forms an aperture through which the sheaths 14, 16 may be inserted, while the second end 12b includes an aperture through which beer is allowed to flow. The second end 12b may include a pressure gauge 18, as desired (see FIG. 3). The pressure gauge 18 is in communication with an interior of the beer filter 10 and provides measurements and/or readings of fluid flow pressure therein. The second end may also include tubing, piping, conduit or means to facilitate fluid flow 20 to which tubing or piping may be connected to facilitate a flow of beer from the filter 10. A pair of pivot arms 22 project radially outwardly from the second end 12b of the outer sheath 12. The pivot arms 22 may be a pintle and gudgeon, socket arm, or any structure that facilitates the rotation of the beer filter 10 with respect to a stand 24 on which the beer filter 10 rests. The pivot arms 22 contact the stand 24, as best shown in FIG. 3. A leg 26 is pivotally attached to the outer sheath 12. The leg 26 may be attached adjacent the first end 12a, the second end 12b, or therebetween of the outer sheath 12. In the embodiment shown in FIG. 1, the leg 26 is attached to the outer sheath adjacent the first end 12a. The stand 24 includes wheels 38 to facilitate movement and positioning of the beer filter 10. The stand 24 further includes a pair of removable pins 40 that hold the outer sheath 12 of the beer filter 10 in a desired position by militating against a rotation thereof.

The outer permeable sheath 14 is an elongate tube having a circular cross-sectional shape. In the embodiment shown, the outer permeable sheath 14 has a 4 in. diameter, though it is understood that the sheaths 14 may have any diameter desired to properly allow for a desired fluid flow of beer through the beer filter 10. It is understood that the outer permeable sheath 14 may have any length, cross-sectional shape, and/or diameter, as desired. The outer permeable sheath 14 has a first end 14a forming an aperture and a second end (not shown) forming an aperture. Each end has a flange extending radially outwardly therefrom, as desired. The flange 42 adjacent the first end 14a may form a fluid tight seal with the outer sheath 12 by either abutting an end thereof or the flange 42 may form the fluid tight seal by fitting within and contacting inner walls of the outer sheath 12. It is understood that the second end may be closed, as desired. The outer permeable sheath 14 includes a plurality of apertures 28 or perforations formed therein along substantially the entire length thereof. It is understood that the perforations 28 may have any size, shape, and frequency as desired, and the perforations 28 may be formed in only certain sides or in certain sections or at desired lengths of the outer permeable sheath 14, as desired.

The inner permeable sheath 16 is an elongate tube having a circular cross-sectional shape and has a diameter less than the diameter of the outer permeable sheath 14. It is understood that the inner permeable sheath 16 may have any length, cross-sectional shape, and/or diameter, as desired. The inner permeable sheath 16 has a first end 30 forming an aperture and a second end forming an aperture. The first end 30 has a flange 36 extending radially outwardly therefrom and a nozzle 32 to which a hose, conduit, nozzle, or other fluid-transfer device may be attached. The flange 36 may form a fluid tight seal against the flange 42 formed at the first end 14a of the outer permeable sheath 14. It is understood that the flange 36 may form a seal with the outer permeable sheath 14 by fitting therein. It is understood that the second end of the inner permeable sheath 16 may be closed, as desired. The inner permeable sheath 16 includes a plurality of apertures 34 or perforations formed therein along substantially the entire length thereof. It is understood that the perforations 34 may have any size, shape, and frequency as desired, and the perforations 34 may be formed in only certain sides or in certain sections or at desired lengths of the inner permeable sheath 16, as desired.

In use, the beer filter 10 is rotated about the pivot arms 22 while on the stand 24 such that the elongate axis of the beer filter 10 is substantially parallel to the ground. Rotation of the beer filter 10 is facilitated by removing the pins 40 from the stand 24. The leg 26 rotates downwardly during the rotation of the beer filter 10 to extend to and contact the ground and provide support for the beer filter 10. The outer permeable sheath 14 is disposed through an end of the outer sheath 12 and then filled with hops (not shown). The inner permeable sheath 16 is then disposed in the outer permeable sheath 14. It is understood that the inner permeable sheath 16 may be fully or partially disposed therein prior to the filling of the outer permeable sheath 14 with the hops. The hops are disposed in a space between the outer permeable sheath 14 and the inner permeable sheath 16. The sheaths 12, 14, 16 are then closed and preferably sealed together to form a fluid tight seal. The sheaths 12, 14, 16 may form a fluid tight seal via gaskets (not shown) or other sealing mechanisms on each of the sheaths 12, 14, 16, or the fluid tight seal may be formed by assembling the sheaths 12, 14, 16 and using a clamp or other device to ensure the sheaths 12, 14, 16 are sealed together. The beer filter 10 is then rotated about the pivot arms 24 and returned to a substantially vertical position. During rotation, the leg 26 rotates toward the outer sheath 12 until substantially abutting and perpendicular thereto. Hoses (not shown) may be connected to each end of the beer filter 10 prior to rotation to the vertical position or after the beer filter 10 is in the vertical position, as desired. It is also understood that the beer filter 10 may be operated with the beer filter 10 in the horizontal position. The hoses provide fluid communication between an interior of a vessel and the interior of the beer filter 10 and to the interior of another vessel. Alternatively, fluid may be caused to flow from the vessel, through the beer filter 10, and back into the vessel.

Once the beer filter 10 is connected to the vessel(s) via the hoses (or other fluid communication device), beer is caused to flow from the vessel into an end of the beer filter, such as the first end 12a. The beer may be caused to flow with a pump (not shown) or other suitable device. The beer is caused to flow through the inner permeable sheath 16 and out therefrom through the perforations 34. The beer then flows through, across, and around the hops in the outer permeable sheath 14 picking up flavor and/or aroma therefrom. The beer then flows through the perforations 28 of the outer permeable sheath 14 and into a space between the outer permeable sheath 14 and the outer sheath 12. The beer then flows out of the other end of the beer filter 10, through the hoses, and into a vessel. The beer may be caused to flow from the vessel through the hops and beer filter 10 as often and for as long as desired until a desired flavor and/or aroma are obtained. Once the beer has the desired flavor and aroma, the flow of beer into the beer filter 10 and the remaining beer therein is caused to flow back to the vessel. The hoses are then disconnected from the beer filter 10, and the spent hops are removed from the beer filter 10, and specifically the outer permeable sheath 14, and the components of the beer filter 10 thereof are cleaned and/or sterilized. By causing the beer to flow through the beer filter 10, the desired flavor and/or aroma is picked up from the hops by the beer without picking up particulates or other chunks or pieces of the hops which remain in the outer permeable sheath 14. Such filtering of the beer through the hops results in a maximized volume of saleable beer that resides in the vessel while minimizing an amount of beer wasted due to being mixed with particulates, pieces, and chunks of hops.

In another embodiment of the invention, the beer filter (not shown) does not include an outer sheath 12 and the outer permeable sheath 14 and inner permeable sheath 16 are disposed within the vessel. It is understood that the beer filter 10 may be used for any brewing or beverage making process that involves infusing any liquid with a flavor. For example, the instant invention contemplates the use of hops, though solid materials for infusing a liquid with flavor or aroma may use used, for example, tea, coffee, fruits, vegetables, flowers, candy, or any material may be used with the beer filter 10, as desired, to make alcoholic or non-alcoholic beverages.

From the foregoing description, one ordinarily skilled in the art can easily ascertain the essential characteristics of this invention and, without departing from the spirit and scope thereof, can make various changes and modifications to the invention to adapt it to various usages and conditions.

I claim:

1. A beer filter comprising:
    an elongate outer sheath having a first end and a second end, the outer sheath having a pair of pivot arms disposed thereon adjacent the second end thereof and a rotatable leg connected to the outer sheath adjacent the first end thereof;
    an elongate outer permeable sheath disposed in the outer sheath through the first end of the outer sheath, the outer permeable sheath having a first end, a second end, and a flange integrally formed therewith extending radially outwardly from an outer surface of the first end thereof, wherein the flange of the outer permeable sheath forms a seal with the first end of the outer sheath, wherein the first end of the outer permeable sheath is adjacent the first end of the outer sheath, and wherein the outer permeable sheath includes a plurality of apertures formed therethrough along substantially the entire length thereof;
    an elongate inner permeable sheath disposed in the outer permeable sheath through the first end of the outer permeable sheath, the inner permeable sheath having a first end, a second end, a flange extending radially outwardly from the first end thereof, and a nozzle directly connected with the first end thereof, wherein the flange of the inner permeable sheath forms a seal with the first end of the outer permeable sheath, wherein the first end of the inner permeable sheath is adjacent the first end of the outer permeable sheath, and wherein the flange of the inner permeable sheath and the nozzle are unconcealed and exposed to the atmosphere; and
    a stand on which the pair of pivot arms in contact therewith, the pivot arms facilitating a rotation of the beer filter with respect to the stand about a first axis of rotation from a first position, wherein the stand is separate from the rotatable leg, and wherein the rotatable leg rotates about a second axis of rotation parallel to the first axis of rotation and supports the beer filter in a non-vertical position of the beer filter.

2. The beer filter of claim 1, further comprising a pressure gauge disposed at the second end of the outer sheath and in communication with an interior of the outer sheath for measuring a fluid pressure therein.

3. The beer filter of claim 2, further comprising a conduit extending axially outwardly from the second end of the outer sheath, wherein the gauge is disposed intermediate the second end of the outer sheath and the conduit.

4. The beer filter of claim 1, wherein the outer permeable sheath has a diameter substantially equal to four inches.

5. The beer filter of claim 1, wherein the inner permeable sheath and the outer permeable sheath are metal.

6. The beer filter of claim 1, wherein the inner permeable sheath and the outer permeable sheath are plastic.

7. A beer filter comprising:
    an elongate outer sheath having a first end and a second end, the outer sheath having a pair of pivot arms disposed thereon at the second end thereof and a rotatable leg connected to the outer sheath adjacent the first end thereof;
    an elongate outer permeable sheath disposed in the outer sheath through the first end of the outer sheath, the outer permeable sheath having a first end, a second end, and a flange integrally formed therewith extending radially outwardly from an outer surface of the first end thereof, wherein the first end of the outer permeable sheath is adjacent the first end of the outer sheath;
    an elongate inner permeable sheath disposed in the outer permeable sheath through the first end of the outer permeable sheath, the inner sheath having a first end, a second end, a flange extending radially outwardly from the first end thereof, and a nozzle directly connected with the first end thereof, wherein the first end of the inner permeable sheath is adjacent the first end of the outer permeable sheath, wherein hops are received in the outer permeable sheath in a space formed intermediate the inner permeable sheath and the outer permeable sheath, wherein the flange and the nozzle of the first end of the inner permeable sheath extends axially outwardly from and remains exterior to the outer sheath and the outer permeable sheath, and wherein the flange of the outer permeable sheath extend axially outwardly from and remains exterior to the outer sheath and axially intermediate the outer sheath and the inner permeable sheath; and
    a stand supporting the beer filter on a ground surface, the pair of pivot arms in contact with the stand, the pivot arms facilitating a rotation of the beer filter with respect to the stand about a first axis of rotation, wherein the stand is separate from the rotatable leg, and wherein the rotatable leg rotates about a second axis of rotation parallel to the first axis of rotation, wherein the beer filter rotates about the first axis of rotation from a vertical first position to a horizontal second position, and wherein the rotatable leg extends to and contacts the ground surface in the horizontal second position of the beer filter to support the beer filter.

8. The beer filter of claim 7, further comprising a pressure gauge in communication with an interior of the outer sheath for measuring a fluid pressure therein.

9. The beer filters of claim 7, wherein the stand includes a pair of removeable pins positioned adjacent the outer sheath militating against a rotation of the outer sheath.

* * * * *